Jan. 4, 1966    J. A. DONOVAN ETAL    3,226,917
AIR CLEANING AND SILENCING ASSEMBLY
Filed May 28, 1962
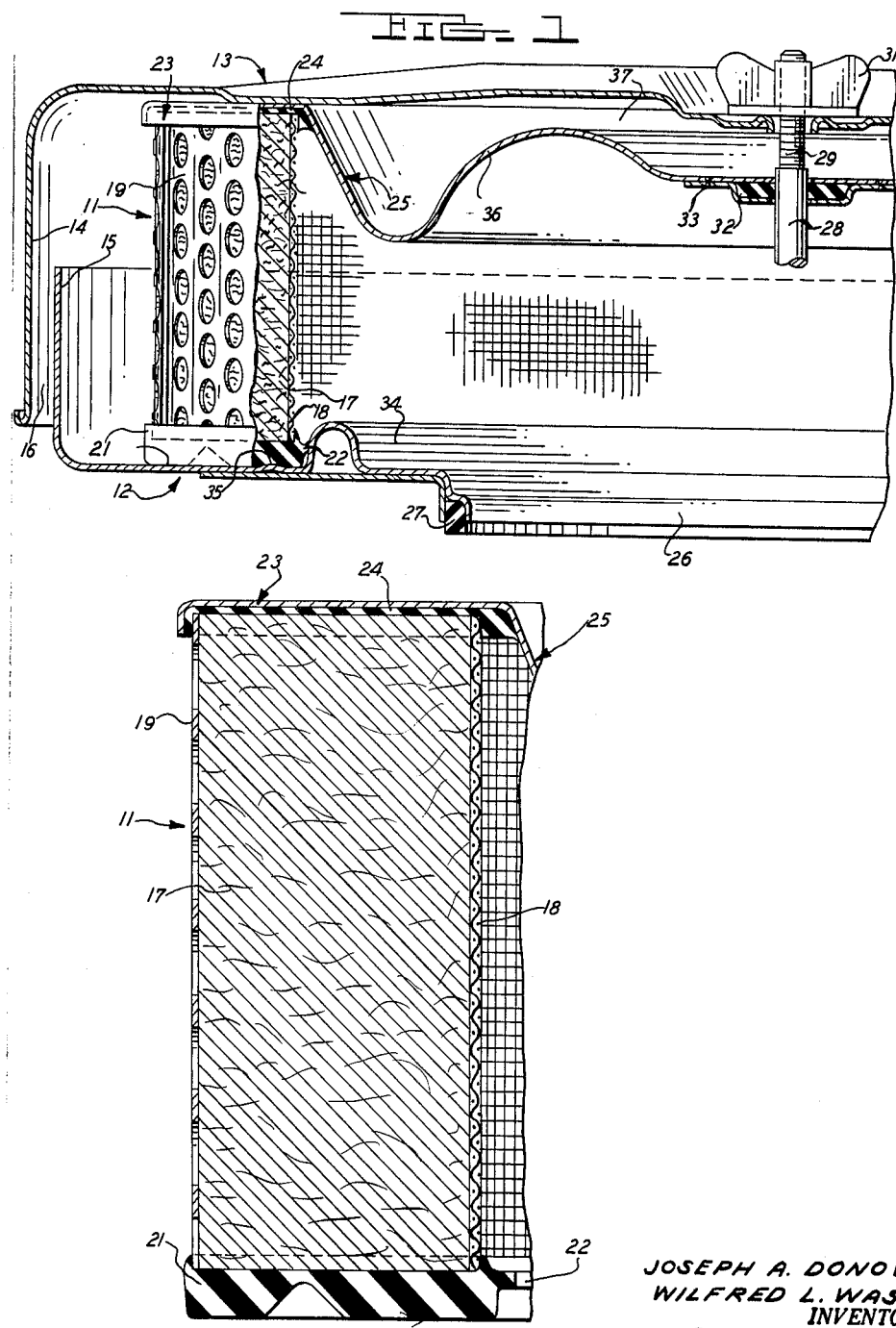
JOSEPH A. DONOVAN
WILFRED L. WAS
             INVENTORS
BY John R. Faulkner
   Thomas H. Oster
   Ernest A. Beutler
                ATTORNEYS

United States Patent Office 3,226,917
Patented Jan. 4, 1966

3,226,917
AIR CLEANING AND SILENCING ASSEMBLY
Joseph A. Donovan, Garden City, and Wilfred L. Was, Dearborn, Mich., assignors to Ford Motor Company, Dearborn, Mich., a corporation of Delaware
Filed May 28, 1962, Ser. No. 198,035
1 Claim. (Cl. 55—276)

This invention relates to internal combustion engines and in particular to a cleaning and silencing assembly for the air induction system of an internal combustion engine.

Cleaning and silencing assemblies for the air induction systems of internal combustion engines frequently utilize replaceable dry filter elements. In the most common form of air cleaner and silencer the replaceable filter element is supported upon a sheet metal tray secured to the body of the charge forming device. A cover plate normally bears against the filter element to form a closure for the central opening of the filter element and to secure the filter element relative to the supporting tray.

A dry type air cleaner and silencer assembly of the type described requires at least two and frequently more air seals. The seals are positioned between the filter element and the cover plate and supporting tray to compensate for manufacturing irregularities in the shape of the mating surfaces of these elements.

If air leakage were permitted through the clearance space present between the mating surfaces, unfiltered air could enter the induction system. The high velocity air flow through the clearance space would also produce objectionable noises. Although the seals effectively reduce air leakage in most instances, they add considerable cost to the assembly.

Paper or some other inflammable material is generally employed as the filtering medium of the filter element. Because of the possibility the engine may backfire through the carburetor, it is desirable to provide a flame shield to deflect the flame away from the filtering medium. It has been difficult to provide an effective but simple flame shield with the air cleaner and silencer assemblies previously known.

It is an object of this invention to provide a simplified air cleaner and silencer assembly that reduces the number of resilient seals required to prevent air leakage past the filter element.

It is a further object of this invention to provide an air cleaner and silencer assembly that incorporates an effective but easy to produce flame shield.

An air cleaning and silencing assembly embodying this invention comprises a supporting tray having a central aperture formed therein. An annular filter element is supported upon the tray in spaced relation to the central aperture of the tray. The filter element has a first end plate affixed to one end thereof that is adapted to form a seal with the tray. A second end plate affixed to the other end of the filter element forms a closure for the central opening of the filter element. Because the second end plate forms a closure for the central opening of the annular filter element, the use of a seal between the filter element and a cover is obviated.

As a further distinctive feature of this invention the second end plate of the filter element has a downwardly extending portion that is spaced from the inner surface of the filter element to provide a flame shield therefor.

A still further distinctive feature of this invention in the use of a cover that extends across the top of the filter element and is spaced from the depressed portion of the second end plate of the filter element. An enclosed space between the second end plate and the cover that serves as a silencing chamber is thus defined.

Further objects and advantages of this invention will become more apparent as this description proceeds, particularly when considered in conjunction with the accompanying drawings, wherein:

FIGURE 1 is a fragmentary cross sectional view taken through an air cleaner and silencer assembly embodying this invention;

FIGURE 2 is an enlarged cross sectional view taken through the replaceable filter element of the assembly shown in FIGURE 1.

Referring now in detail to the drawings, there is shown an air cleaner and silencer assembly comprising a replaceable dry filter element 11 supported between a sheet metal tray 12 and a cover 13. The cover 13 is provided with a depending side 14 that encircles an upstanding flange 15 formed integrally with the tray 12. An annular air admission opening 16 is defined between the depending side 14 and the upstanding flange 15. If desired, the length and width of the air admission opening 16 may be tuned to provide a silencing effect as taught in application Serial No. 165,638 entitled Air Cleaner and Silencer, filed in the name of Robert C. McKinlay on January 11, 1962 and assigned to the assignee of this invention.

The replaceable filter element 11 comprises a filtering medium 17 normally pleated paper contained between an inner cylinder 18 formed of wire mesh and an outer perforated cylinder 19. An annular lower end plate 21 is rigidly affixed to the lower end of the replaceable filter element 11. The lower end plate 21 has a lip portion 22 that extends radially inwardly of the filter element 11. The lower end plate 21 is formed of a resilient material. Alternatively, the lip portion 22 may be the only resilient portion of the lower end plate. In that case the remaining portion of the lower end plate 21 may be formed of a substantially rigid material.

An upper end plate, indicated generally at 23, is affixed to the upper end of the filter element 11 by means of a bonding material 24 that forms a seal therebetween. The upper end plate 23 is at least of the same diameter as the outer perforated cylinder 19 and additionally has a center portion 25 that extends across the central opening of the filter element 11 defined by the inner wire mesh cylinder 18 to form a closure therefor. Because of this construction the use of resilient seals between the filter element 11 and the cover 13 is obviated.

The tray 12 has a central aperture formed therein by a downturned flange 26. The air cleaner and silencer assembly is adapted to be supported upon the carburetor or other charge forming device of the internal combustion engine with the central aperture of the tray 12 in alignment with the air inlet opening of the charge forming device. A resilient seal 27 is contained within the tray 12 around the downturned flange 26. The resilient seal 27 prevents air leakage between the air cleaner and silencer assembly and the charge forming device.

A rod 28 having an upper threaded end 29 is secured in a known manner to a portion of the engine. A wing nut 31 is threaded upon the end 29 of the rod 28 and bears against the cover 13 to hold the air cleaning and silencing assembly upon the engine. A resilient seal 32 is positioned around the rod 28 by a sheet metal retainer 33 that is spot welded to the upper end plate 23 of the filter element 11. The seal 32 prevents air leakage around the exterior of the rod 28.

Coaxial with its central opening and radially outward therefrom, the tray 12 is formed with an upstanding portion or bead 34. The lip portion 22 of the lower end plate 21 overlaps the bead 34. When the air cleaner and silencer assembly is secured to the engine by the wing nut 31, the lip portion 22 is deformed by the bead 34. This establishes an air-tight seal between the lower end of the filter element 11 and the tray 12. The bead 34 also serves to locate the filter element 11 in substantially coaxial relation to the central aperture of the tray 12. Additional sealing between the filter element 11 and the tray 12 may be provided by a raised ridge 35 formed in the surface of the tray 12 radially outwardly from the bead 34. When the wing nut 31 is tightened, the resilient lower end plate 21 will be deformed by the ridge 35 to form a further seal.

The center portion 25 of the upper end plate 23 is toroidal in shape. Inwardly from the inner cylindrical surface of the filter element 11, defined by the inner wire mesh cylinder 18, the center portion 25 extends downwardly and away from the inner wire mesh cylinder 18. At a point that is radially between the downturned flange 26 and the inner wire mesh cylinder 18, the center portion 25 of the upper end plate 23 curves upwardly to form a dome part 36. The dome part 36 is positioned above the central aperture of the tray 12. The dome part 36 provides a flame shield for the filter element 11. If the engine backfires through its air induction system, flame will travel upwardly through the central aperture in the tray 12. The flame will strike the sheet metal dome part 36 and be directed away from the adjacent inner surface of filter element 11.

It should be additionally noted that the center portion 25 of the upper end plate 23 is spaced from the cover 13. This spacing defines a closed chamber 37. The chamber 37 provides an insulating chamber for the assembly that will deaden sounds emitted from the air induction system.

Reference has been made to "upper" and "lower" portions of the air cleaning and silencing assembly. It is thereby understood that these terms are relative only and have been used to connote the proximity of the portions of the assembly to the charge forming device. The lower portion is, of course, the portion nearest the charge forming device while the upper portion is the portion most remote from the charge forming device. When the air cleaning and silencing assembly is attached in the normal manner to a downdraft carburetor, the terms "upper" and "lower" will refer to their actual physical position. These terms will not apply, however, in their literal sense when the air cleaning and silencing assembly is attached to a sidedraft or updraft carburetor.

It is to be understood that the invention is not limited to the construction shown and described but that various changes and modifications may be made without departing from the spirit and scope of the invention as defined by the appended claim.

We claim:

An air cleaning and silencing assembly for an internal combustion engine comprising, a supporting tray having a central aperture formed therein, an upturned portion formed in said tray around said central aperture, an annular filter element supported on said tray around said upturned portion, said filter element having a lower end plate affixed thereto, said lower end plate having a radially inwardly extending resilient lip portion positioned in overlapping relation to said upturned portion of said tray, an upper end plate affixed to the upper end of said filter element, said upper end plate extending across the central opening of said filter element and forming a closure therefor, said end plate being formed with a toroidal central portion comprising a downwardly extending part spaced from the internal surface of said filter element and an upwardly extending part positioned above said central aperture, a cover extending across said filter element and bearing against said upper end plate, said cover and said toroidal central portion of said upper end plate being spaced and defining an enclosed silencing chamber in opposed relation to said central aperture of said tray, and fastening means urging said cover into contact with said upper end plate and said filter element against said tray to deform said resilient lip portion against said upturned portion of said tray to form a seal therebetween.

References Cited by the Examiner

UNITED STATES PATENTS

| | | | |
|---|---|---|---|
| 2,064,207 | 12/1936 | Jacobs. | |
| 2,228,750 | 1/1941 | Brock | 55—403 |
| 2,632,526 | 3/1953 | Brock et al. | 55—510 |
| 2,675,886 | 4/1954 | McMullen | 55—510 |
| 2,739,916 | 3/1956 | Parker. | |
| 2,934,165 | 4/1960 | Dudinec | 55—498 |
| 2,973,832 | 3/1961 | Cook et al. | 55—498 |
| 2,988,170 | 6/1961 | Pritchard | 55—502 X |
| 2,996,145 | 8/1961 | Thornburgh | 55—502 X |
| 3,039,254 | 6/1962 | Thornburgh | 55—276 |
| 3,095,290 | 6/1963 | Hockett | 55—502 |
| 3,104,966 | 9/1963 | Goulet et al. | 55—510 |
| 3,160,488 | 12/1964 | Wilber | 55—501 |

FOREIGN PATENTS 736,133   8/1955   Great Britain.

ROBERT F. BURNETT, *Primary Examiner.*

HARRY B. THORNTON, *Examiner.*